United States Patent
Kim et al.

(10) Patent No.: US 11,870,137 B2
(45) Date of Patent: Jan. 9, 2024

(54) SLOT ANTENNA AND SLOT ANTENNA ARRAY

(71) Applicant: LG ELECTRONICS INC., Seoul (KR)

(72) Inventors: Sungjoo Kim, Seoul (KR); Heuideok Lee, Seoul (KR); Yongchul Yoon, Seoul (KR); Byeongrim Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1133 days.

(21) Appl. No.: 16/500,782

(22) PCT Filed: Aug. 21, 2018

(86) PCT No.: PCT/KR2018/009596
§ 371 (c)(1),
(2) Date: Oct. 3, 2019

(87) PCT Pub. No.: WO2019/039833
PCT Pub. Date: Feb. 28, 2019

(65) Prior Publication Data
US 2023/0146641 A1    May 11, 2023

Related U.S. Application Data

(60) Provisional application No. 62/550,135, filed on Aug. 25, 2017.

(51) Int. Cl.
*H01Q 1/32* (2006.01)
*G01S 13/931* (2020.01)
(Continued)

(52) U.S. Cl.
CPC ......... *H01Q 1/3233* (2013.01); *G01S 13/931* (2013.01); *H01Q 13/10* (2013.01);
(Continued)

(58) Field of Classification Search
CPC .. H01Q 1/3233; H01Q 13/10; H01Q 21/0075; H01Q 21/06; G01S 13/931; G01S 2013/93271
See application file for complete search history.

(56) References Cited

U.S. PATENT DOCUMENTS 3,696,433 A * 10/1972 Killion ................... H01Q 13/22
                                                            333/237
2015/0255856 A1* 9/2015 Hong .................... H01Q 21/061
                                                            343/702
(Continued)

FOREIGN PATENT DOCUMENTS

CN      101577368      11/2009
CN      103840271      6/2014
(Continued)

OTHER PUBLICATIONS

PCT International Application No. PCT/KR2018/009596, International Search Report dated Dec. 21, 2018, 3 pages.
(Continued)

*Primary Examiner* — Donald HB Braswell
(74) *Attorney, Agent, or Firm* — LEE, HONG, DEGERMAN, KANG & WAIMEY (57) ABSTRACT

Disclosed is a slot antenna provided in a radar, the antenna comprising a substrate integrated waveguide (SIW) having a plurality of a plurality of slots, wherein each of the plurality of slots includes a first elongated opening, a second elongated opening, and a connecting opening connecting the first and second elongated openings, wherein a first center axis of the first elongated opening is offset from a second center axis of the second elongated opening.

19 Claims, 12 Drawing Sheets

(51) Int. Cl.
*H01Q 13/10* (2006.01)
*H01Q 21/00* (2006.01)
*H01Q 21/06* (2006.01)

(52) U.S. Cl.
CPC ......... *H01Q 21/0075* (2013.01); *H01Q 21/06* (2013.01); *G01S 2013/93271* (2020.01)

(56) References Cited

U.S. PATENT DOCUMENTS

| | | | | |
|---|---|---|---|---|
| 2016/0028164 | A1* | 1/2016 | Watanabe | H01Q 21/005 343/771 |
| 2016/0047893 | A1* | 2/2016 | Izadian | H04B 7/0617 342/368 |
| 2016/0329639 | A1* | 11/2016 | Kasahara | H01Q 13/22 |
| 2017/0194716 | A1* | 7/2017 | Kirino | H01Q 13/06 |

FOREIGN PATENT DOCUMENTS

| | | |
|---|---|---|
| CN | 104221217 | 12/2014 |
| CN | 104659463 | 5/2015 |
| CN | 105206938 | 12/2015 |
| CN | 106716171 | 5/2017 |
| JP | 2008113314 | 5/2008 |
| JP | 2009239858 | 10/2009 |
| JP | 2016213553 | 12/2016 |
| KR | 101092846 | 12/2011 |
| KR | 200467798 | 7/2013 |
| KR | 1020150006839 | 1/2015 |

OTHER PUBLICATIONS

European Patent Office Application Serial No. 18848188.1, Search Report dated Apr. 19, 2021, 13 pages.

Frank Bauer et al., "A 79-GHz Resonant Laminated Waveguide Slotted Array Antenna Using Novel Shaped Slots in LTDD", IEEE Antennas and Wireless Propagation Letters, vol. 12, Jan. 2013, pp. 296-299.

The State Intellectual Property Office of the People's Republic of China Application Serial No. 201880069401.9, Office Action dated Dec. 16, 2021, 17 pages.

\* cited by examiner

SLOT ANTENNA AND SLOT ANTENNA ARRAY

CROSS-REFERENCE TO RELATED APPLICATIONS

This application is the National Stage filing under 35 U.S.C. 371 of International Application No. PCT/KR2018/009596, filed on Aug. 21, 2018, which claims the benefit of U.S. Provisional Application No. 62/550,135, filed on Aug. 25, 2017, the contents of which are all incorporated by reference herein in their entirety.

TECHNICAL FIELD

The present invention relates to a slot antenna which may be utilized in a lidar that detects an object located in vicinity of a vehicle.

BACKGROUND ART

A vehicle is an apparatus that transports a user riding therein in a desired direction. A representative example of a vehicle may be an automobile.

A variety of sensors and electronic devices are mounted in vehicles for convenience of a user who uses the vehicle. In particular, for driving convenience, an Advanced Driver Assistance System (ADAS) has been actively studied. In addition, enormous efforts have been being made to develop autonomous vehicles.

In order to implement the ADAS or an autonomous vehicle, a radar for a vehicle is used. A radar for a vehicle according to an existing technology utilizes a frequency domain with a 1 GHz bandwidth of 76 to 77 GHz in in millimeter-wave frequency bands.

In recent years, a radar for a vehicle using a frequency domain with a 4 GHz bandwidth of 77 to 81 GHz with has been developed. If the 4 GHz bandwidth of 77 to 81 GHz is used, the radar may exhibit better range resolution due to broadband frequency characteristics. In addition, in this case, the radar may play a role of an ultrasonic sensor and hence it may be used in parking assistance, autonomous parking, and other applications which require high resolution in a short range.

A microstrip antenna conventionally used at frequencies of a 1 GHz has a short-range available bandwidth and thus it is not suitable to be used within a 4 GHz bandwidth. Thus, there are demands for an antenna capable of being used in a 4 GHz bandwidth.

DISCLOSURE

Technical Problem

The present invention has been made in view of the above problems, and it is one object of the present invention to provide an antenna used in a radar for a vehicle with a wide-range available bandwidth.

Objects of the present invention should not be limited to the aforementioned objects and other unmentioned objects will be clearly understood by those skilled in the art from the following description.

Technical Solution

In order to accomplish the above object, a slot antenna according to an embodiment of the present invention may include a substrate integrated waveguide (SIW) having a plurality of bent slots formed therein.

The details of other embodiments are included in the following description and the accompanying drawings.

Advantageous Effects

According to the present invention, there are one or more effects as follows.

First, there is an advantageous effect in providing an antenna having a small size but able to be used within a 4 GHz bandwidth of 77 to 81 GHz.

Second, there is an advantageous effect in manufacturing an antenna with low manufacturing costs.

Third, there is an advantageous effect in making it easy to couple.

Effects of the present invention may not be limited to the above and other objects which are not described may be clearly comprehended by those of skill in the art to which the embodiment pertains through the following description.

DESCRIPTION OF DRAWINGS

The embodiments will be described in detail with reference to the following drawings in which like reference numerals refer to like elements wherein.

BEST MODE

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and sprit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", "includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile, however it will be understood that the disclosure is not limited thereto. Further, although discussed herein with respect to use in vehicles, it will be understood by those of ordinary skill in the art that the features of the disclosure, such as the configurations of antennas, antenna arrays, and the like, including the use thereof, may be applicable to other applications, environments, devices, machines, products, and the like related or unrelated to vehicle detection systems, and that such implementations and applications of the various embodiments discussed herein are considered by and included in this disclosure.

A vehicle as described in this specification may include all types of vehicles, including those having an engine as a power source, a hybrid vehicle including both an engine and an electric motor as a power source, and an electric vehicle including an electric motor as a power source, and the like.

In the following description, "the left side of the vehicle" refers to the left side in the forward driving direction of the vehicle, and "the right side of the vehicle" refers to the right side in the forward driving direction of the vehicle.

Figure 1:
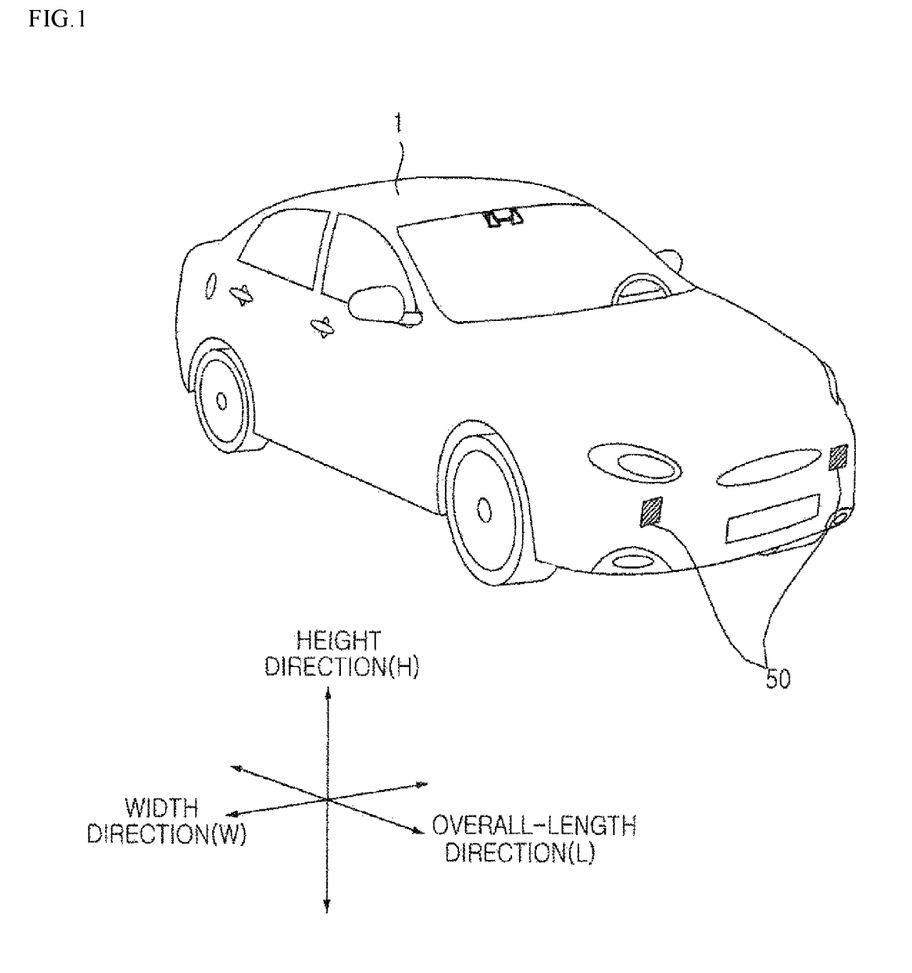
FIG. 1 is a diagram showing an external appearance of a vehicle according to an embodiment of the present invention.

FIG. 1 is a diagram showing an external appearance of a vehicle according to an embodiment of the present invention.

Referring to FIG. 1, a vehicle 1 may be an autonomous vehicle or a manual driving vehicle. The vehicle 1 may switch to an autonomous driving mode or a manual driving mode based on a user input. For example, the vehicle 1 may switch from the manual driving mode to the autonomous driving mode or vice versa based on a user input received through a user interface device 200. In some cases, the vehicle 1 may switch to the autonomous driving mode or the manual driving mode based on driving situation information.

The driving situation information may include at least one of information on an object outside the vehicle, navigation information, or vehicle state information. For example, based on driving situation information generated by an object detection apparatus 300, the vehicle 1 may switch from the manual driving mode to the autonomous driving mode or vice versa. In another example, based on driving situation information received through a communication apparatus 400, the vehicle 1 may switch from manual driving mode to the autonomous driving mode or vice versa.

Based on information, data, or a signal provided from an external device, the vehicle 1 may switch from the manual driving mode to the autonomous driving mode or vice versa.

Here, "overall length" means the length from the front end to the rear end of the vehicle 1, "width" means the width of the vehicle 1, and "height" means the distance from the lower end of a wheel to the top of the roof of the vehicle 1. In the following description, the overall length direction L may be the direction based on which the overall length of the vehicle 1 is measured, the width direction W may be the direction based on which the width is measured, and the height direction H may be the direction based on which the height is measured.

The vehicle 1 may include a radar 50 for the vehicle. The radar 50 may be disposed at an appropriate position external to the vehicle to sense an object located at the front, rear, or either side of the vehicle.

The radar 50 may include an antenna. In some implementations, the antenna included in the radar 50 may function as a transmit antenna and a receive antenna. In some implementations, the radar 50 may include a transmit antenna and a receive antenna.

The radar 50 may detect an object located in the vicinity of the vehicle 1. The radar 50 may acquire a position of the detected object, a distance to the detected object, and a speed relative to the detected object.

The object located in vicinity of the vehicle 1 may include for example, a lane or lane marker, another vehicle, a pedestrian, a two-wheeled vehicle, a traffic signal, light, a road, a structure, a speed bump, a geographical feature, an animal, and the like.

The lane or corresponding markers may be the lane in which the vehicle 1 is currently traveling, a lane next to the lane in which the vehicle 1 is traveling, or a lane in which an opposing vehicle is traveling. The lane may include left and right lines that define the lane. The lane may include an intersection.

Another vehicle may be a vehicle that is travelling in the vicinity of the vehicle 1. The other vehicle may be a vehicle within a predetermined distance from the vehicle 1. For example, the other vehicle may be a vehicle travelling ahead of the vehicle 1 or following the vehicle 1.

The pedestrian may be a person located in the vicinity of the vehicle 1. The pedestrian may be a person located within a predetermined distance from the vehicle 1. For example, the pedestrian may be a person located on a sidewalk or a roadway.

The two-wheeled vehicle may be a vehicle that is located in the vicinity of the vehicle 1 and moves with two wheels. The two-wheeled vehicle may be a vehicle that has two wheels within a predetermined distance from the vehicle 1. For example, the two-wheeled vehicle may be a motorcycle or a bicycle on a sidewalk or a roadway.

The traffic signal may include a traffic signal lamp, a traffic sign, or a pattern or text painted on a road surface.

The light may be light generated by a lamp provided in another vehicle. The light may be light generated by a streetlight. The light may be solar light.

The road may include a road surface, a curve, or slopes, such as an upward slope and a downward slope.

The structure may be an object located in the vicinity of the road and fixed to the ground. For example, the structure may include a streetlight, a roadside tree, a building, a signal lamp, a bridge, a curb, or a wall surface, and the like.

The geographical feature may include a mountain, a hill, etc.

The object may be classified as a movable object or a stationary object. For example, a movable object may include another vehicle and a pedestrian. A stationary object may include a traffic signal, a road, or a structure, another vehicle in a stopped state, a pedestrian in a stopped state, and the like.

Figure 2:
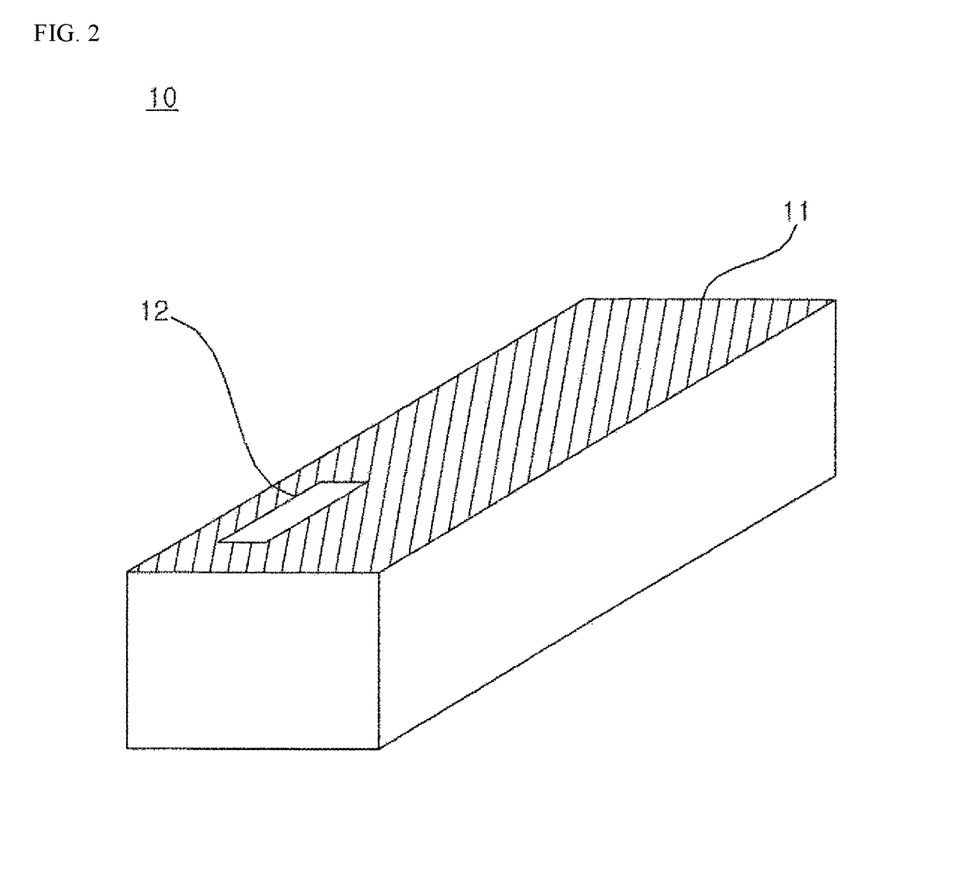
FIG. 2 is a diagram showing a slot antenna according to an existing technology.

FIG. 2 is a diagram showing a slot antenna according to an existing technology.

Referring to FIG. 2, a slot antenna 10 according to an existing technology has a slot formed on one surface of a waveguide 11 to thereby radiate electromagnetic waves into a free space.

As shown in FIG. 2, the slot antenna 10 according to the existing technology utilizes a wide-range available bandwidth but has a volume that is too large to be used in a vehicle. In order to solve this problem, a slot antenna according to an embodiment of the present invention is proposed.

Figure 3:
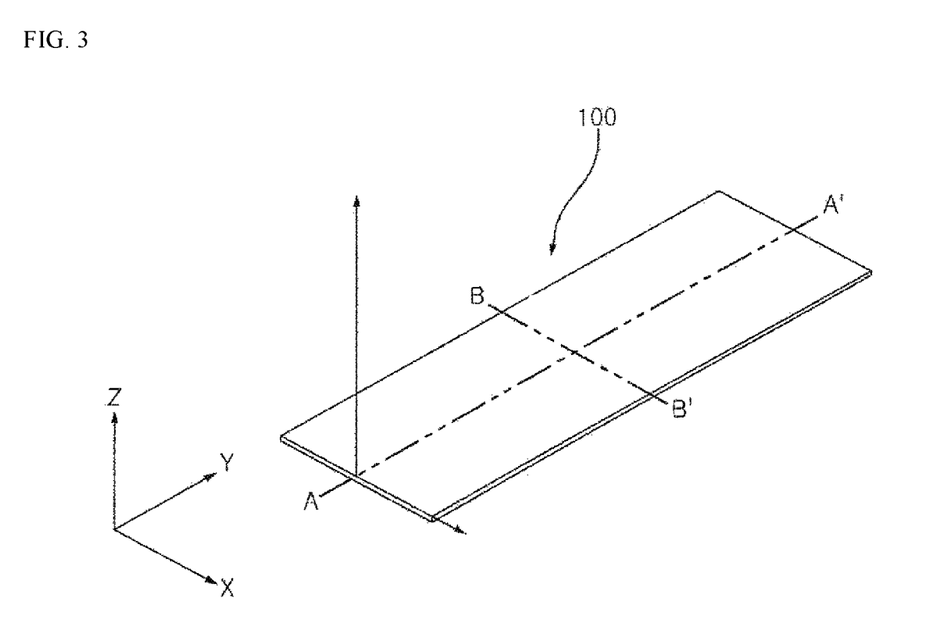
FIG. 3 is a perspective view of a slot antenna according to an embodiment of the present invention.
Figure 4:
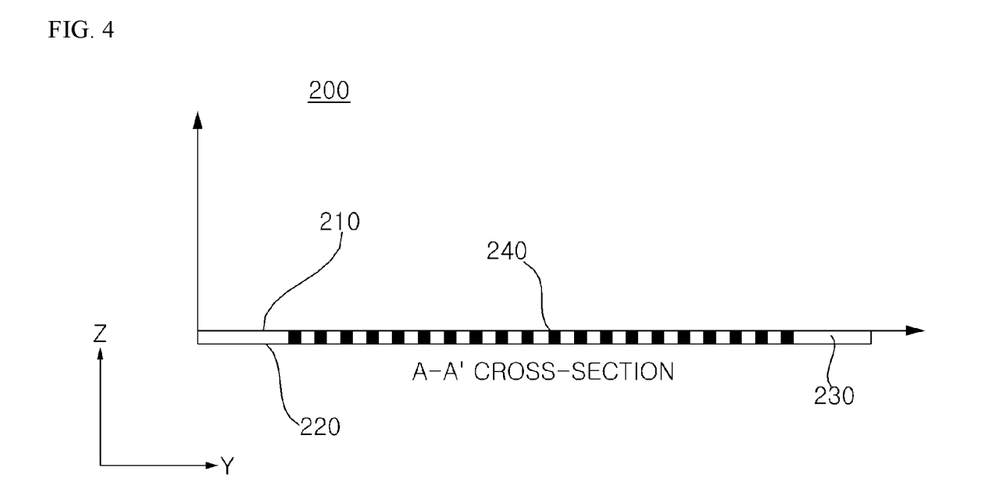
FIG. 4 is a cross-section view A-A' of FIG. 3.
Figure 5:
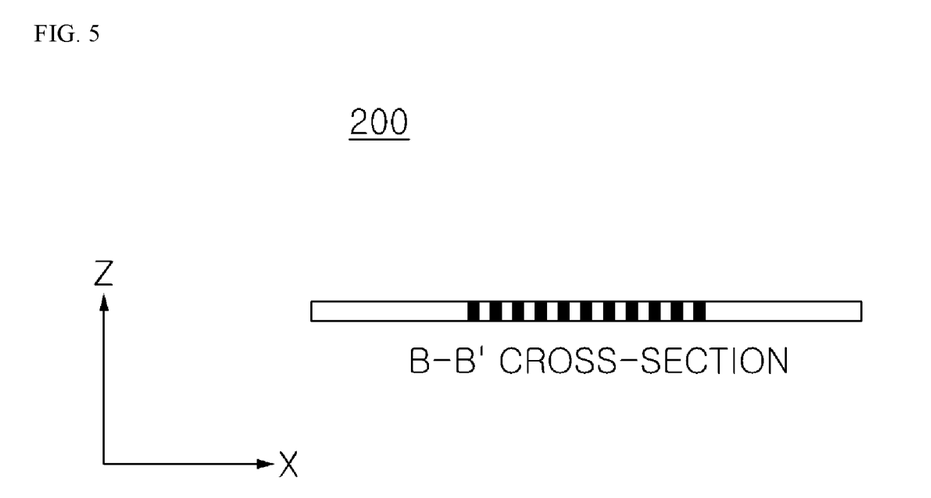
FIG. 5 is a cross-section view B-B' of FIG. 3.
Figure 6:
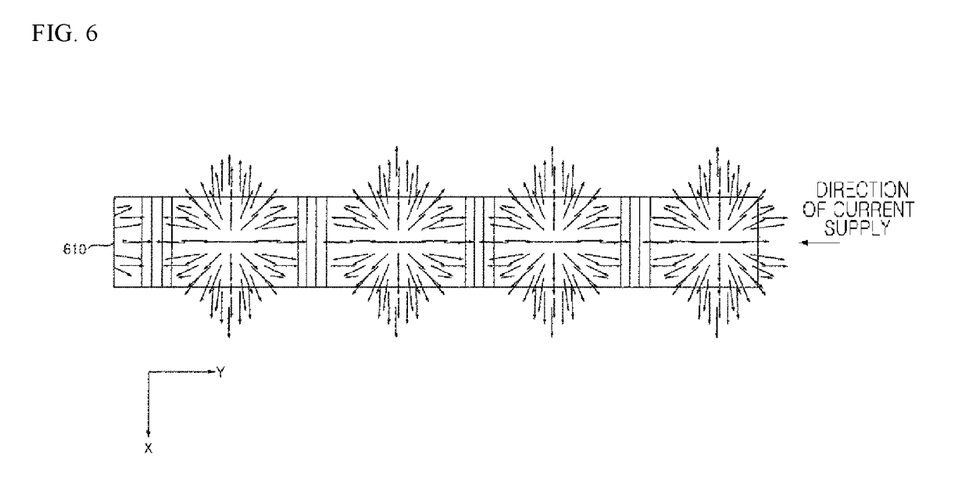
FIG. 6 is a diagram showing a surface current at a point in time on a substrate integrated waveguide (SIW) according to an embodiment of the present invention.
Figure 7:
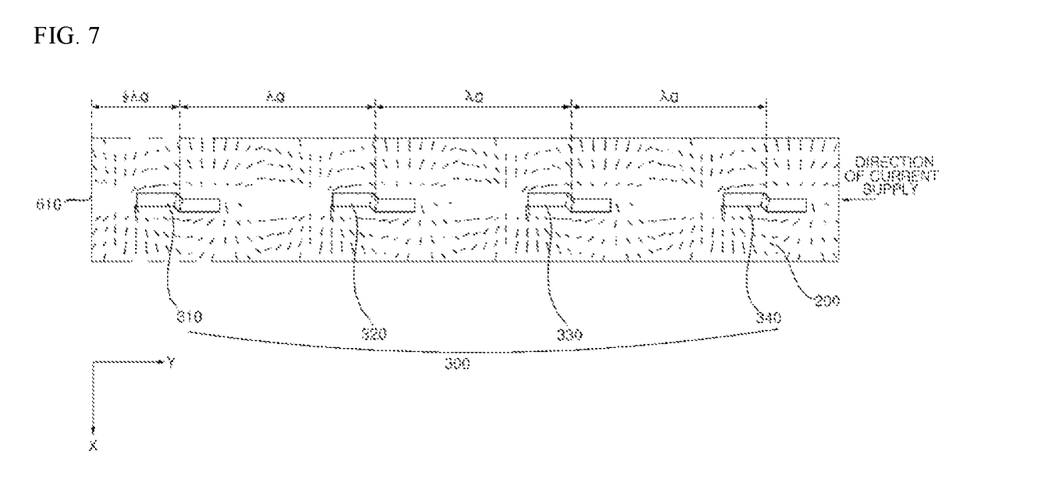
FIG. 7 is a top view of a slot antenna according to an embodiment of the present invention.
Figure 8:
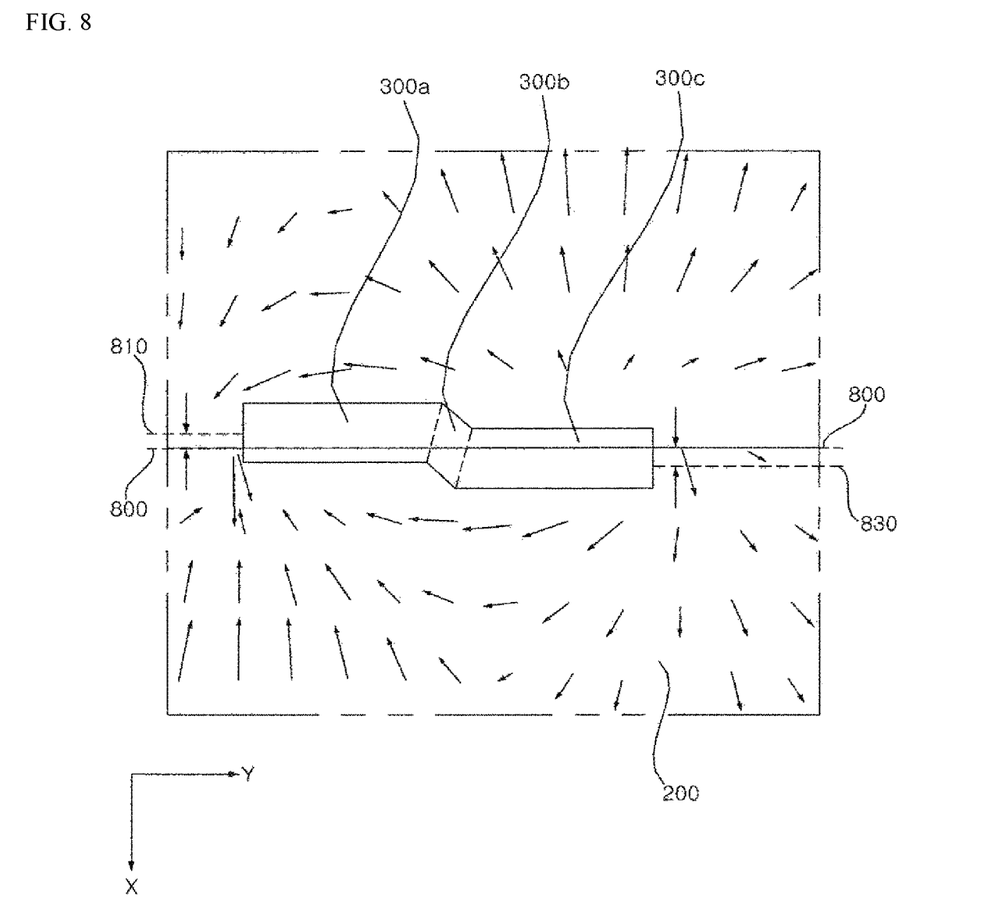
FIG. 8 is an enlarged view of a portion of FIG. 7.

FIG. 3 is a perspective view of a slot antenna according to an embodiment of the present invention. FIG. 4 is a cross-section view A-A' of FIG. 3. FIG. 5 is a cross-section view B-B' of FIG. 3. FIG. 6 is a diagram showing a surface current at a point in time on a substrate integrated waveguide (SIW) according to an embodiment of the present invention. FIG. 7 is a top view of a slot antenna according to an embodiment of the present invention. FIG. 8 is an enlarged view of a portion of FIG. 7.

Referring to FIGS. 3 to 8, an antenna 100 may include a substrate integrated waveguide (SIW) 200.

The SIW 200 may be implemented using a printed circuit board (PCB). Via holes may be formed to surround one region of the PCB, and the SIW 200 may be formed by inserting metal into the via holes. The via holes formed to surround one area of the PCB may be referred to as a via fence.

As such, the SIW 200 is implemented using the PCB, and hence, it may be relatively easy to electrically connect to an electronic component (e.g., Monolithic Microwave Integrated Circuit (MMIC)) of a radar 50 and it is possible to minimize a volume occupied by the radar 30 in the vehicle. In addition, it is possible to use a bandwidth wider than in existing technologies.

The SIW 200 may include a first metal plate 210, a second metal plate 220, a dielectric material 230, and a via fence.

The first metal plate 210 may be formed of copper (Cu). The first metal plate 210 may be referred to as a thin copper foil or a copper plate.

The second metal plate 220 may be formed of copper (Cu). The second metal plate 220 may be referred to as a thin copper foil or a copper plate. The second metal plate 220 may be electrically connected to the first metal plate 210 through a plurality of via holes 240. The plurality of via holes 240 may be formed to surround one region. The plurality of via holes 240 may be referred to as a via fence.

The dielectric material 230 may be interposed between the first metal plate 210 and the second metal plate 220. The dielectric material 230 may be a low loss dielectric material.

The SIW 200 may be defined as a stereoscopic shape surrounded by the via fence and having a length, a width, and a height. A length direction of the SIW 200 may be construed as Y direction and -Y direction in FIG. 3. A width direction of the SIW 200 may be construed as X direction and -X direction in FIG. 3. A height direction of the SIW 200 may be construed as Z direction and -Z direction in FIG. 3.

When power is supplied, a surface current may be formed on the SIW 200. The surface current may be formed on at least one of the first metal plate 210 or the second metal plate 220. The surface current may be in the form of standing waves because a short-circuit surface may be formed by the via fence. The short-circuit surface may be formed on a surface opposite to a power supply direction in the SIW 200.

The SIW 200 may have a guided wavelength $\lambda g$.

A plurality of bent slots 300, also referred to herein as slots 300, may be formed in the SIW 200.

The plurality of bent slots 300 may be formed on the first metal plate 210.

The plurality of bent slots 300 may cause discontinuity in the surface current of the SIW 200. As such, discontinuity is caused in the surface current of the SIW 200, whereby electromagnetic waves may be radiated into a free space.

As shown in FIG. 8, each of the plurality of slots 300 may include a first slot 300a, a second slot 300b, and a third slot 300c. The first slot 300a may be elongated in the length direction of the SIW 200. The second slot 300b may be formed from the end of the first slot in a direction different from the length direction of the SIW 200. The third slot 300c may be elongated from the end of the second slot in the length direction of the SIW 200.

In the SIW 200, there may be formed the first slot elongated in the length direction of the SIW 200 (e.g., Y direction), the second slot 300b formed from the end of the first slot 300a in a direction (e.g., a diagonal direction) different from the length direction of the SIW 200, and the third slot 300c elongated from the end of the second slot 300b in the length direction of the SIW 200 (e.g., Y direction).

The first slot 300a may be formed to be offset in a first direction (e.g., -X direction) from a virtual center line 800 extending in the length direction of the SIW 200. A virtual center line 810 in a horizontal direction of the first slot 300a may be spaced apart from the virtual center line 800, which extends in the length direction of the SIW 200, by a first distance D in the first direction (e.g., -X direction).

The third slot 300c may be formed to be offset in a direction (e.g., X direction), which is opposite to the first direction, from the virtual center line 800 extending in the length direction of the SIW 200. A center line 830 in a horizontal direction of the third slot 300c may be spaced apart from the virtual center line 800, which extends in the length direction of the SIW 200, by the first distance D in a direction (e.g., X direction) opposite to the first direction. Here, the spacing distance is equal to the distance of the center line 810 of the first slot 300a from the virtual center line 800.

One end of the second slot 300b may be connected to the first slot 300a, and the other end of the second slot 300b may be connected to the third slot 300c. At least a portion of the second slot 300b may intersect the virtual center line 800 extending in the length direction of the SIW 200.

As such, the first slot 300a has an offset in the first direction and the third slot 300c has an offset in a direction opposite to the first direction, and hence, it is possible to radiate electromagnetic waves in accordance with change in phase of currents over time and within a wide-range bandwidth.

As shown in FIG. 7, a first bent slot 310 and a second bent slot 320 may be formed in the SIW 200.

The first bent slot 310 may be formed such that the center thereof is spaced apart from the short-circuit surface 610 by one half the guided wavelength λg in the length direction of the SIW 200. The center of the first bent slot 310 may be construed as the central point of the total length of the first bent slot 310. The center of the first bent slot 310 may be positioned on the virtual center line 800 extending in the length direction of the SIW 200.

The second bent slot 320 may be formed such that the center thereof is spaced apart from the first bent slot 310 by the guided wavelength λg in the length direction of the SIW 200. The center of the second bent slot 320 may be construed as the central point of the total length of the second bent slot 310. The center of the second bent slot 320 may be positioned on the virtual center line 800 in the length direction of the SIW 200.

In some implementations, the SIW 200 may have further bent slots 330 and 430 formed therein. The plurality of bent slots 300 may be spaced apart by a distance of the guided wavelength λg.

Each of the plurality of bent slots 300 may have a length that corresponds to one half a wavelength of a resonant frequency used to transmit and receive electromagnetic waves.

Figure 9:
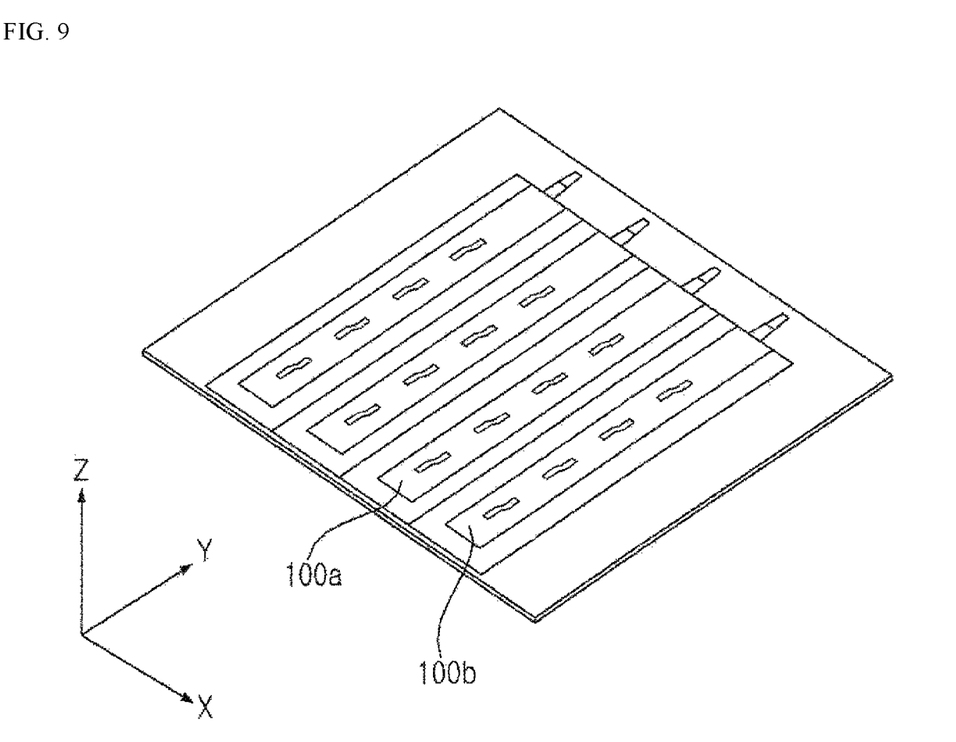
FIGS. 9 and 10 are diagrams for explanation of a slot antenna array according to an embodiment of the present invention.
Figure 10:
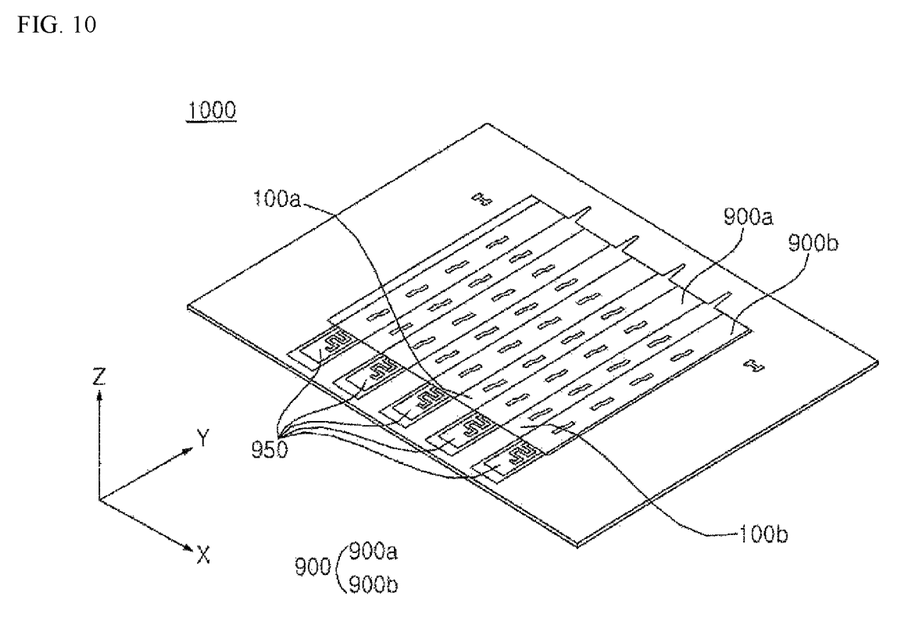

FIGS. 9 and 10 are diagrams for explanation of a slot antenna array according to an embodiment of the present invention.

FIG. 9 shows an example of a slot antenna array including a plurality of slot antennas.

Referring to FIG. 9, a slot antenna array 1000 may include a plurality of slot antennas 100. The description about the slot antenna 100 in FIGS. 1 to 8 may apply to the plurality of slot antennas 100 in FIGS. 9 and 10.

The slot antenna array 1000 may be provided in a radar 50 that detects an object located in vicinity of a vehicle 1.

The slot antenna array 1000 may include a first slot antenna 100a, and a second slot antenna 100b electrically connected with the first slot antenna 100a.

The first slot antenna 100a may include a first SIW having a plurality of bent slots formed therein. The description about the plurality of bent slots 300 in FIGS. 1 to 8 may apply to the plurality of bent slots in FIG. 9. The description about the SIW 200 in FIGS. 1 to 8 may apply to the first SIW in FIG. 9.

The second slot antenna 100b may include a second SIW having a plurality of bent slots. The description about the plurality of bent slots 300 in FIGS. 1 to 8 may apply to the plurality of bent slots in FIG. 9. The description about the SIW 200 in FIGS. 1 to 8 may apply to the second SIW in FIG. 9.

FIG. 10 shows an example of a slot antenna array including a plurality of slot antennas and a plurality of dummy antennas.

Referring to FIG. 10, edge effects may occur in the slot antenna array 1000 in FIG. 9. Since an outer slot antenna and an inner slot antenna have different characteristics (e.g., impedance characteristics), this difference may affect overall performance of the slot antenna array 1000. In addition, the plurality of slot antennas may interfere with one another, possibly distorting a radiation pattern of the slot antenna array 1000.

In order to improve the radiation pattern distortion, the slot antenna array 1000 may further include at least one dummy antenna 900 that is disposed in the vicinity of at least one of the first slot antenna 100a or the second slot antenna 100b.

As the at least one dummy antenna 900, the slot antenna 100 described above with reference to FIGS. 1 to 8 may be used. The at least one dummy antenna 900 is not connected with an electronic device and another antenna of the radar 50.

The at least one dummy antenna 900 may be interposed between the plurality of slot antennas 100. The at least one dummy antenna 900 may be interposed between the first slot antenna 100a and the second slot antenna 100b. The at least one dummy antenna 900 may be disposed external to the outermost antenna among the plurality of slot antennas 100.

For impedance matching of the at least one dummy antenna 900, the slot antenna array 1000 may further include at least one terminator 950 respectively connected to the at least one dummy antenna. The terminator 950 may be provided in a number corresponding to the number of dummy antennas 900.

While the slot antenna 100 is impedance matched and connected to an electronic component of the radar 50, the at least one dummy antenna 900 is not connected to any electronic component of the radar 50 and therefore the terminator 950 is needed for additional impedance matching.

The terminator 950 may be implemented by forming a predetermined pattern on a PCB through etching or the like. The pattern may be in a serpentine shape in which a single line continues so as not to intersect in the width direction and the length direction of the SIW 200.

The terminator 950 may be formed in a layer different from a layer on which the first slot antenna 100a and the second slot antenna 100b are formed. As the first terminator 950 is positioned on the layer different from the layer in which the first slot antenna 100a and the second slot antenna 100b are formed, transmission and reception functions of the first slot antenna 100a and the second slot antenna 100b are not affected.

Meanwhile, the at least one dummy antenna 900 may be formed in the layer on which the first slot antenna 100a and the second slot antenna 100b are formed. A slot penetrating the at least one dummy antenna 900 may be formed in at least a portion of the at least one dummy antenna 900. The at least one dummy antenna 900 and the terminator 950 formed in the layer different from the layer on which the at least one dummy antenna 900 is formed may be electrically connected with each other through the slot. The slot formed in the at least one dummy antenna 900 may be in the shape of H.

Figure 11:
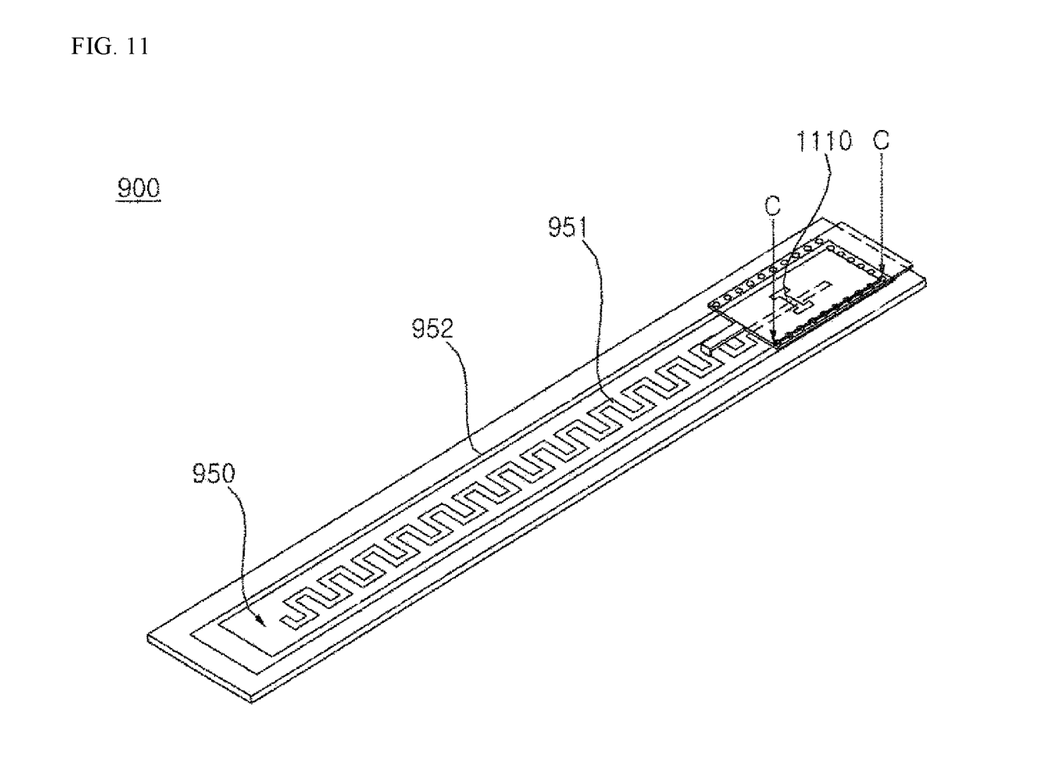
FIG. 11 is a diagram for explanation of a terminator according to an embodiment of the present invention.

FIG. 11 is a diagram for explanation of a terminator according to an embodiment of the present invention.

Figure 12:
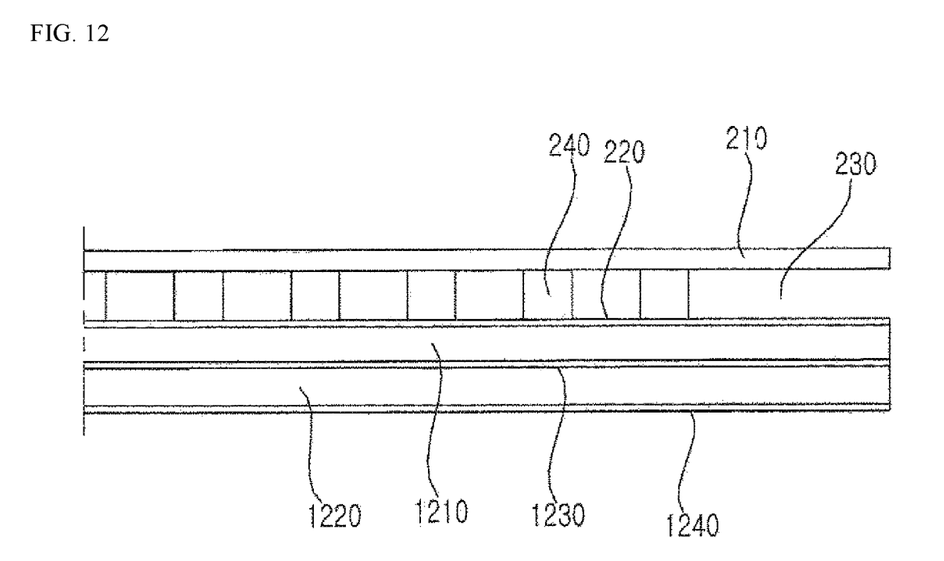
FIG. 12 is a cross-section view C-C' of FIG. 11.

FIG. 12 is a cross-section view C-C' of FIG. 11.

Referring to FIGS. 11 and 12, the at least one dummy antenna 900 may include a first metal plate 210, a second metal plate 220, a dielectric material 230, a via fence 240, a third metal plate 1230, a fourth metal plate 1240, a first high loss dielectric material 1210, and a second high loss dielectric material 1220.

Description provided with reference to FIGS. 1 to 10 may apply to the first metal plate 210, the second metal plate 220, the dielectric material 230, and the via fence 240.

The terminator 950 may include the third metal plate 1230, the fourth metal plate 1240, the first high loss dielectric material 1210, and the second high loss dielectric material 1220.

The first metal plate 1230 may be formed of copper (Cu). The third metal plate 1230 may be referred to as a thin copper foil or a copper plate. The third metal plate 1230 may be interposed between the first high loss dielectric material 1210 and the second high loss dielectric material 1220.

A first strip line 951 and a second strip line 952 may be formed in the third metal plate 1230. The first strip line 951 may be formed in a serpentine shape in which a single line continues so as not to intersect in the width direction and the length direction of the SIW 200. The second strip line 952 may be formed in a shape to surround the first strip line 951.

The fourth metal plate 1240 may be formed of copper (Cu). The fourth metal plate 1240 may be referred to as a thin copper foil or a copper plate.

The first high loss dielectric material 1210 may be interposed between the second metal plate 220 and the third metal plate 1230.

The second high loss dielectric material 1220 may be interposed between the third metal plate 1230 and the fourth metal plate 1240.

An H-shaped slot 1110 may be formed in the second metal plate 220. In the SIW 200, a signal may be transmitted to the terminator 950 through the H-shaped slot 1110 formed in the second metal plate 220.

Since the first strip line 951 is surrounded by the first high loss dielectric material 1210 and the second high loss dielectric material 1220, a considerable amount of signal loss occurs in the first strip line 951. The signal transmitted through the H-shaped slot 1110 may disappear due to the first micro strip 951 and the first and second high loss dielectric materials 1210 and 1220. In this case, the second strip line 952 may prevent a leakage of the signal so as not to affect other antennas.

Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

What is claimed is:

1. A slot antenna comprising:
   a substrate integrated waveguide (SIW) comprising a plurality of slots;
   wherein each of the plurality of slots comprises:
      a first elongated opening elongated along a length direction of the slot antenna;
      a second elongated opening elongated along the length direction to be parallel to the first elongated opening; and
      a connecting opening connecting the first and second elongated openings,
   wherein a first center axis of the first elongated opening is offset from a second center axis of the second elongated opening, and
   wherein the connecting opening is obliquely angled with respect to the length direction such that the first and second elongated openings do not overlap in a direction orthogonal to the length direction.

2. The slot antenna of claim 1, wherein the first center axis is offset from a center axis of the slot antenna in a first direction; and
   wherein the second center axis is offset from the center axis of the slot antenna in a second direction opposite to the first direction.

3. The slot antenna of claim 2, wherein the first center axis and the second center axis are offset from the center axis by an equal offset width.

4. The slot antenna of claim 1, wherein the first center axis is parallel to the second center axis.

5. The slot antenna of claim 4, wherein the first center axis and the second center axis are parallel to the center axis.

6. The slot antenna of claim 1, wherein the center axis of the slot antenna bisects the connecting opening.

7. The slot antenna of claim 1, wherein the plurality of slots comprises:
   a first combined slot having a first center point positioned from a short-circuit surface by a first length along the center axis;
   a second combined slot having a second center point positioned from the first center point by a second length along the center axis,
   wherein the first length is half of the second length.

8. The slot antenna of claim 7, wherein the second length is a length of a guided wavelength of the slot antenna.

9. The slot antenna of claim 1, wherein the plurality of slots causes discontinuity in a surface current of the SIW.

10. The slot antenna of claim 1, wherein each of the plurality of slots has a length that corresponds to one half a wavelength of a resonant frequency used to transmit and receive electromagnetic waves.

11. A slot antenna array comprising:
    a first slot antenna; and
    a second slot antenna electrically connected to the first slot antenna,
    wherein the first slot antenna comprises a substrate integrated waveguide (SIW) having a plurality of slots formed therein, and
    wherein the second slot antenna comprises an SIW having a plurality of slots formed therein,
    further comprising at least one dummy antenna disposed in vicinity of at least one of the first slot antenna or the second slot antenna, and
    further comprising at least one terminator comprising a predetermined pattern on a printed circuit board and connected to the at least one dummy antenna for impedance matching of the dummy antenna.

12. The slot antenna array of claim 11, wherein the at least one dummy antenna is interposed between the first slot antenna and the second slot antenna.

13. The slot antenna array of claim 11,
    wherein the at least one dummy antenna comprises a first strip line and a second strip line, and
    wherein the first strip line is formed in a serpentine shape and the second strip line surrounds the first strip line.

14. The slot antenna array of claim 13, wherein the first slot antenna and the second slot antenna are formed in different layers.

15. The slot antenna array of claim 11, wherein each of the plurality of slots of the first and second slot antennas comprises:
    a first elongated opening elongated along a length direction of the slot antenna;
    a second elongated opening elongated along the length direction to be parallel to the first elongated opening; and
    a connecting opening connecting the first and second elongated openings, wherein a first center axis of the first elongated opening is offset from a center axis of the slot antenna in a first direction, wherein the second center axis is offset from the center axis of the slot antenna in a second direction opposite to the first direction, and wherein the first center axis and the second center axis are offset from the center axis by an equal offset width, and wherein the connecting opening is obliquely angled with respect to the length direction such that the first and second elongated openings do not overlap in a direction orthogonal to the length direction.

16. The slot antenna array of claim 15, wherein each of the plurality of slots has a length that corresponds to one half a wavelength of a resonant frequency used to transmit and receive electromagnetic waves.

17. A slot antenna comprising:
a substrate integrated waveguide (SIW) comprising a plurality of bent slots;
wherein each of the plurality of bent slots comprises a first elongated opening elongated along a length direction of the slot antenna and a second elongated opening elongated along the length direction to be parallel to the first elongated opening, wherein the first and second elongated openings are connected by an angled connecting opening connecting the first and second elongated openings, and wherein the connecting opening is obliquely angled with respect to the length direction such that the first and second elongated openings do not overlap in a direction orthogonal to the length direction.

18. The slot antenna of claim 17, wherein a first center axis of the first elongated opening is offset from a second center axis of the second elongated opening.

19. The slot antenna of claim 18, wherein the first center axis and the second center axis are offset from a center axis of the slot antenna by an equal offset width in opposite directions, and wherein the first center axis and the second center axis are parallel to the center axis.

* * * * *